United States Patent [19]
Olson et al.

[11] 3,821,963
[45] July 2, 1974

[54] LIQUID PROPORTIONING APPARATUS

[75] Inventors: Roy C. Olson, Rockton, Ill.; Charles G. Haire, Cranston, R.I.

[73] Assignee: Merit Industries, Inc., Cranston, R.I.

[22] Filed: Sept. 22, 1972

[21] Appl. No.: 291,227

[52] U.S. Cl. .................................. 137/99, 417/405
[51] Int. Cl. ......................................... G05d 11/035
[58] Field of Search............ 137/99, 101.21, 101.31; 417/405, 406, 568; 92/140; 418/79

[56] References Cited
UNITED STATES PATENTS

| | | | |
|---|---|---|---|
| 862,867 | 8/1907 | Eggleston............................ | 417/390 |
| 1,320,942 | 11/1919 | Tefft..................................... | 92/140 |
| 1,539,728 | 5/1925 | Ensign ................................. | 418/79 |
| 1,899,295 | 2/1933 | Schulze............................. | 92/140 X |
| 2,696,266 | 12/1954 | Tuve ................................. | 137/99 X |
| 2,778,317 | 1/1957 | Cockburn ...................... | 418/189 X |
| 2,949,924 | 8/1960 | Cochran .............................. | 137/99 |
| 3,010,404 | 11/1961 | Anderson.......................... | 137/99 X |
| 3,053,842 | 9/1962 | Meissner........................... | 137/99 X |
| 3,570,508 | 3/1971 | Boggs et al. ..................... | 137/99 X |

Primary Examiner—Robert G. Nilson
Attorney, Agent, or Firm—Trask, Jenkins & Hanley

[57] ABSTRACT

An apparatus for injecting a liquid fertilizer or the like into a water flow wherein the flow of the water is utilized to drive a fluid motor which in turn drives a pumping mechanism to effect the fertilizer injection. A predeterminable volumetric ratio of fertilizer to water is obtained and maintained without regard to changes in the pressure and the rate of flow of the water since the speed at which the pumping mechanism is driven is directly proportional to the pressure and the velocity of the water flowing through the fluid motor.

10 Claims, 5 Drawing Figures

LIQUID PROPORTIONING APPARATUS

BACKGROUND OF THE INVENTION

The present invention relates to a liquid proportioning device for injecting a liquid into another flowing liquid to form a predeterminable volumetric ratio of the two liquids which is unaffected by alterations in the pressure and velocity of the flowing liquid.

Commercial greenhouses, nurseries and crop growers use liquid fertilizers and various chemicals for their plants which can be most easily applied by spraying. The liquid fertilizers and chemicals can be purchased in bulk, concentrated quantities which are diluted by adding the concentrate in fairly exact proportions to a volume of water. The mixing, or proportioning, of the concentrate into the water is best accomplished by injecting the concentrate into the flow of the water as it is being conveyed to the plants.

The apparatus for carrying out the proportioning must accordingly be regulated as the pressure and velocity of the water increases and decreases to maintain a degree of consistency in the volumetric ratio between the concentrate and the water. Furthermore, such apparatus must be capable of performing its function without unduly reducing the pressure of the flowing water, as the pressure is needed to effect the spraying or otherwise wide spread distribution of the combined liquids. Such an apparatus must also be unaffected by the chemical compositions with which it is used and be dependable and easy to service.

SUMMARY OF THE INVENTION

In accordance with the present invention, we provide a liquid proportioning apparatus which utilizes a flowing liquid to proportion a predeterminable amount of another liquid into the liquid flow. The predetermined volumetric ratio of the two liquids is maintained in the event of changes in the flow rate and pressure of the flowing liquid by making the amount of the proportioned liquid which is added dependent on the pressure and velocity of the flowing liquid.

More specifically, the apparatus comprises a fluid motor which is driven by a first liquid, such as water, flowing therethrough, and which has an output speed dependent on, and proportional to, the velocity and pressure of the first liquid. The motor output is used to drive a pumping apparatus which proportions amounts of a second liquid, such as liquid fertilizer, into the flow of the first liquid in accordance with the output speed of the liquid driven motor. The amount of the second liquid which is added to form a predetermined volumetric ratio with the first liquid can be adjustably altered to change the relative proportions of the prepared solution.

In a preferred embodiment, the motor comprises a multivane rotor eccentrically and rotatably mounted within a housing. The vanes are movably mounted on the rotor and are forced radially outward against the inner surface of the housing as the motor is rotated by a liquid flowing therethrough. Relief passages can be provided in the housing to control the number of vanes being driven at any given time and to reduce any back pressure against the vanes.

The output shaft of the fluid motor can be used to drive, at a preselected rate, a pumping apparatus which is responsible for proportioning the proper amount of the second liquid into the flowing stream of the first liquid. The use of the fluid motor output to drive the pumping apparatus assures the close relationship needed between the flow rate of the first liquid and the amount of the second liquid which must be added to acquire the desired volumetric ratio of the two liquids.

The output shaft speed of the fluid motor can be reduced by an appropriate gear configuration before being applied to the pump. The pump itself can be of any type, but a positive displacement variety, such as a piston and cylinder or a diaphragm type, is preferred.

The reciprocal action needed as the input for a positive displacement pump can be obtained using a double eccentric drive which is driven by the geared down output of the fluid motor. In this instance, the relationship of the eccentrics can be altered to obtain the required reciprocal stroke needed for the pump to supply the proper amount of the second liquid to the flow of the first liquid to achieve the desired volumetric ratio of the two liquids.

BRIEF DESCRIPTION OF THE DRAWINGS

The accompanying drawings illustrate the invention and, by way of example, show a preferred embodiment of the invention. In such drawings.

DETAILED DESCRIPTION OF THE PREFERRED EMBODIMENT

The preferred embodiment of the invention, as illustrated in the accompanying drawings, is particularly suited for nursery, greenhouse and field crop usage in adding liquid fertilizer and the like to a flowing water stream prior to the application of such stream to plant beds as by spraying. Any fluctuations in the flow rate or pressure of the water will not affect the particular volumetric ratio of fertilizer to water thereby formed, since it is the flow rate and pressure of the water which determines the speed at which a reciprocating pump arm is driven to effect a proportional flow of the fertilizer liquid.

Figure 1:
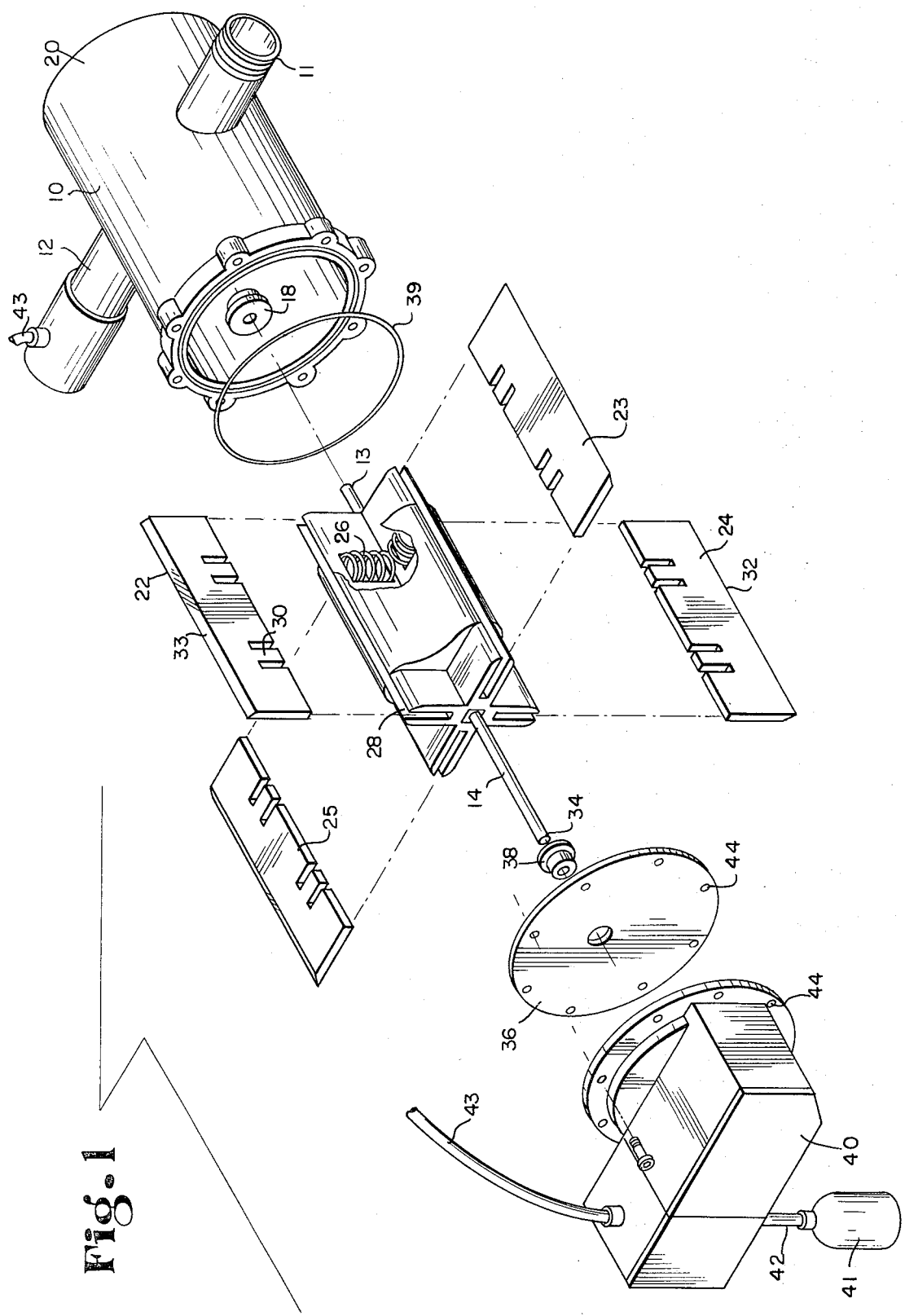
FIG. 1 is a perspective view, in partially exploded form, of apparatus which embodies the invention.
Figure 2:
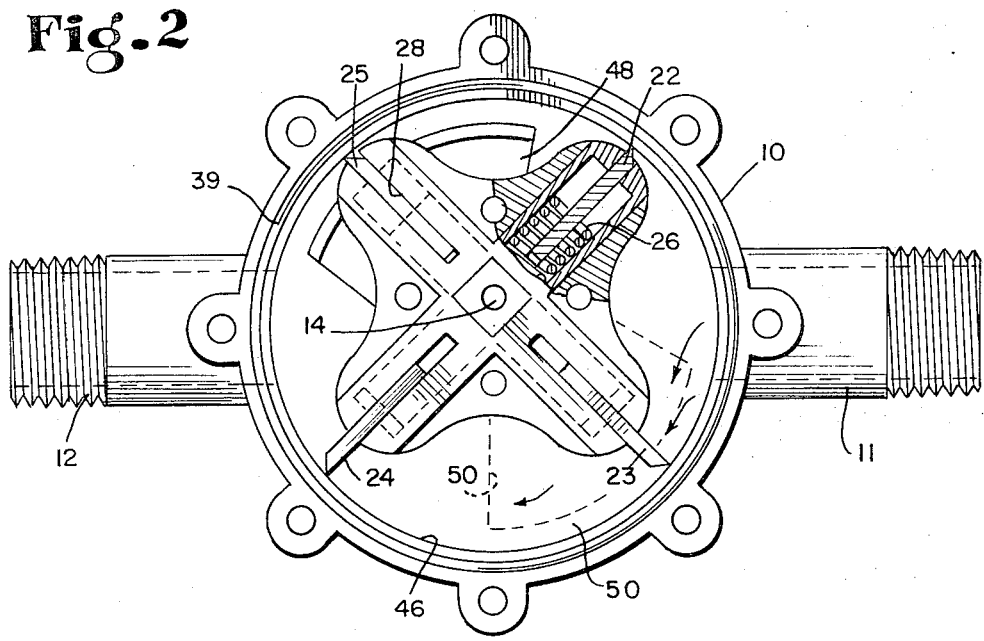
FIG. 2 is a cross-sectional view of the fluid motor shown in FIG. 1.

More specifically, a water motor is illustrated in FIGS. 1 and 2, comprising a housing 10 which is molded or otherwise formed from a material such as the thermoplastics like acrylonitrile butidiene styrene and polyester fiberglass or a non-corrosive metal such as brass. Materials such as these make the housing corrosion proof and relatively impervious to chemical attack. A water inlet port 11 and exhaust port 12 intersect and communicate with the housing 10 at positions approximately 180° apart.

One end 13 of the mounting shaft 14 of a rotor body 16 is mounted in, and supported by, a bearing 18 in the closed end 20 of the housing 10. The bearing 18 is positioned such that the center of rotation of the rotor 16 is eccentrically located with respect to the center of the housing 10. The reason for this will be explained below.

Four vanes 22 through 25 are movably positioned on springs 26 in receiving slots 28 in the rotor 16. The vanes 22 through 25 protrude above the edge of the respective containing slots 28 by an amount prescribed by the depth of slots 30 in the vanes, the upper edges of which contact the top of the spring 26. The spring mounting of the vanes 22 through 25 permits radial movement of the vanes toward the center of the rotor 16 when sufficient pressure is applied to the exposed edges 32 of the vanes to compress the springs.

Each of these edges 32 is angularly relieved to reduce the friction incurred as the vanes wipe the inner surface of the housing 10 as the rotor 16 is rotated. The vanes 22 through 25 are aided in this regard by their component material which is preferably and primarily polytetrafluoroethylene to which has been added a nonabrasive filler to resist wear of both the vanes and the inner surface of the housing.

The other end 34 of the rotor shaft 14 passes through, and is supported in, an end plate 36 by a bearing 38. A water tight seal of the housing is maintained by a sealing ring 39 which is positioned between the housing 10 and the end plate 36, the inner surface of which can be treated with polytetrafluoroethylene to reduce the friction between it and the rotating rotor vanes 22 through 25.

The end 34 of the rotor shaft 14 which extends out of the end plate 36 is utilized to drive the pumping mechanism 40 which can be bolted directly onto the end plate 36 as by bolts 44. The liquid fertilizer or the like is pumped from a storage container 41 through a flexible hose 42 by the mechanism 40, and through an outlet hose 43 into the exhaust pipe 12 of the water motor to complete the desired formulation of the fertilizer solution.

The specific operation of the fluid motor is best described with reference to FIG. 2. Fluid, in this case water, enters the housing 10 through the inlet pipe 11. The eccentric mounting of the rotor shaft 14 within the housing 10 permits the vanes 23 and 24 in the lower half of the housing 10 to extend radially outward from the rotor 16 into contacting relationship with the interior housing wall 46. At the same time, the two vanes 22 and 25 in the upper half of the housing 10 are forced proportionately into their respected slots 28 in the rotor 16 by the interior housing wall 46. The greater expanse of area presented to the incoming fluid by the first vane 23 nearest the inlet pipe 11 causes the incoming fluid to circulate down and around the lower half of the housing as shown by the arrows in FIG. 2. The rotor body 16 is thereby rotated by force of the water flow against this vane 23. The water, after transversing the bottom half of the housing 10, exits through the exhaust pipe 12.

The rear, enclosed portion 20 of the housing 10 has a relief 48 therein which begins approximately in the area of the exhaust pipe 12 and extends for approximately a 90° arc. This relief 48 allows waters to circumvent the end of the vane 25 in communication therewith to dissipate any back pressure incurred by water trapped between the two upper vanes 25 and 22 as the rotor is rotated. In addition, a second relief 50 may be provided, shown in dotted lines in FIG. 2, which communicates with the vane 23 on the arcuately downward side of the inlet pipe 11. The incoming water is then able to flow down and around the extended vane 23 so that there is only one vane 24 used in driving the rotor 16. The use of the second relief 50 further reduces any pressure drop between the inlet pipe 11 and the exhaust pipe 12.

Figure 3:
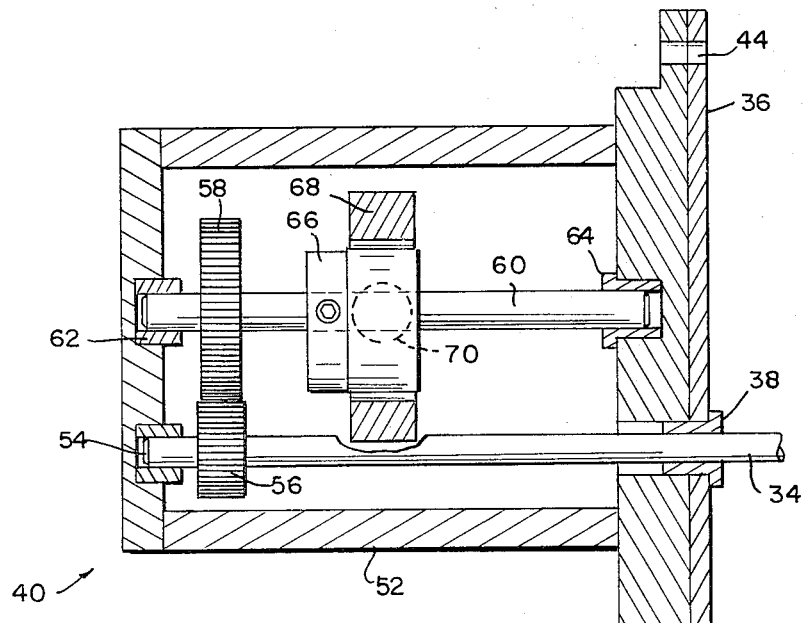
FIG. 3 is a side elevational view, partially in section, showing the drive mechanism for a pumping apparatus used in the invention.

As shown in FIG. 3, the rearward end 34 of the rotor shaft 14 is supported in the fluid motor back plate 36 by a bearing 38. This end 34 of the shaft 14 extends into a drive unit 52 in the pumping mechanism 40 and is rotatably supported at its end by a bearing 54. A driving gear 56 is fixed to this shaft and is used to drive a second gear 58 fixed to a short, driven shaft 60 which is supported at its two ends by bearings 62 and 64.

Figure 4:
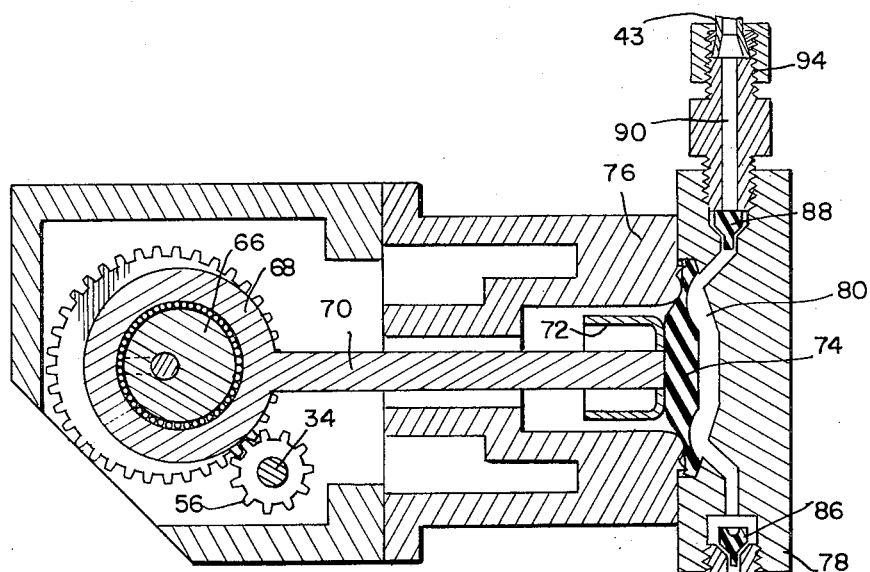
FIG. 4 is a cross-sectional view taken along line 4—4 of FIG. 3.

An inner eccentric 66 is mounted on this shaft 60 and supports a second and outer eccentric 68. The outer eccentric 68 effects the reciprocation of a pump drive shaft 70, shown in FIG. 4. The double eccentric character of this mechanism allows the stroke of the driving shaft 70 to be adjusted by altering the relationship of the eccentrics 66 and 68 with respect to one another.

The outer end of the drive rod 70 is terminated in a cylindrical flange 72 which provides increased support area for attachment to a flexible diaphragm 74. The flexible diaphragm 74 is also connected at its perimeter to the main pump body 76. A valve body 78 is mounted on the pump body 76 to form a pumping chamber 80 with the diaphragm 74. The pump shaft 70 is reciprocated by the two driven eccentrics 66 and 68 to pump liquid fertilizer or the like from the supply container 41 through the flexible inlet hose 42 and into a supply passage 84 in the valve body 78. The incoming liquid unseats a gravity seated check valve 86 and flows into the pumping chamber 80.

Thereafter, the reciprocating diaphragm 74 forces the liquid out of the pumping chamber 80 which seats the first check valve 86, unseats a second gravity seated check valve 88 and then leaves the pump via an exit passage 90. The outlet conveying hose 43 is attached to the upper end of the outlet passage 90 as by a threaded coupling 94. The other end of this hose 43 intersects the exhaust pipe 12 of the fluid motor to inject the liquid fertilizer carried therein into the water flowing out of the motor. The amount of liquid fertilizer thereby injected is directly proportional to the speed at which the water turns the rotor vanes 22 through 25, whereby a predeterminable volumetric ratio of the two liquids results.

Figure 5:
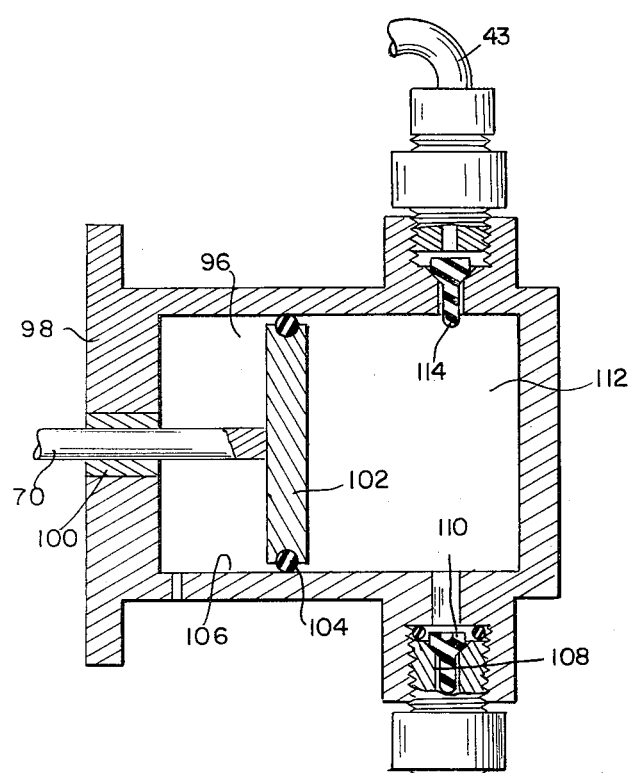
FIG. 5 is a cross-sectional view of an alternate pumping apparatus.

An alternate pumping apparatus is shown in FIG. 5. In this case, the reciprocating pumping arm 70 extends into a cylinder 96 through a cylinder wall 98 and is supported therein by a bushing or sleeve 100. The arm 70 is attached at its forward end within the cylinder 96 to a piston 102. A piston ring 104 is mounted on the circumference of the piston 102 and wipes the inner surface 106 of the piston 102 as the pumping arm 70 reciprocates the piston 102 and the ring 104. The movement of the piston 102 to the left in FIG. 5 causes liquid fertilizer from the supply container 41 to flow through an inlet passage 108 and displace a gravity seating check valve 110 before entering the pumping end of the cylinder 112. The liquid is then caused, as the piston 102 moves to the right, to reseat the first check valve 108 and to displace a second gravity seating check valve 114 and flow through an outlet passage 116 into the outlet tube 43 which conveys the liquid to the exhaust pipe 12 of the liquid motor.

Although the motor has been described utilizing a high impact, non-corrosive housing, any appropriate housing material can be used which can withstand relatively high pressures, on the order of 80 psi, and which can tolerate the potentially corrosive fluids which may be used. Similarly, polytetrafluoroethylene vanes have been found most advantageous for the present use due to the non-sticking characteristic of the material, but, again, any appropriate material may be used which produces an adequate low friction wiping action.

The liquid motor, while powered with water in the preferred embodiment, can be driven with any fluid flow desirably in the range of from 5 gallons per minute to 100 gallons per minute. The reliefs in the closed end 20 of the housing 10 can be appropriately disposed in the housing to effect the most desirable combination of output speed and pressure drop across the pump for the particular liquid utilized.

While positive displacement pumps and pumping apparatus are preferred, any pumping apparatus making use of the rotory output of the water motor may be used without deviating from the scope of our invention.

We claim:

1. A liquid proportioning apparatus, which comprises a housing having an inlet port and an outlet port arcuately disposed from one another and being for receiving and discharging a first flowing liquid; a first shaft rotatably and eccentrically mounted in and with respect to said housing; a rotor body mounted on said first shaft; a plurality of vanes movably supported in said rotor body, said rotor body including means to operatively force said vanes radially outward from said rotor body into wiping engagement with the inner surface of said housing, said first shaft having an eccentric mounting for causing a number of said plurality of vanes to extend further from said rotor body than the remainder of said plurality of vanes whereby said first liquid flows against some of said number of further extending vanes to rotate said rotor body and thereby said first shaft before being discharged through said outlet port; a pump driving mechanism including a second shaft, gear coupling means for drivingly coupling said first shaft and said second shaft; a first eccentric member mounted on said second shaft, and a second eccentric member supported by said first eccentric member; and a pumping means operatively coupled to said second eccentric member for being driven thereby, said pumping means having an inlet passage coupled to a second liquid and an outlet passage coupled to said housing outlet port, said pumping means being for pumping said second liquid to said outlet port in accordance with the output speed of said first shaft and the relationship between said first and second eccentric members.

2. A liquid proportioning apparatus as claimed in claim 1 wherein said housing has an arcuately extending relief disposed therein for preventing said first liquid from being arcuately driven by one of said plurality of vanes.

3. A liquid proportioning apparatus as claimed in claim 1 wherein said pumping means is a positive displacement pump.

4. A liquid proportioning apparatus as claimed in claim 1 wherein said means to operatively force said vanes radially outward includes a plurality of springs mounted in said rotor body and wherein said rotor body is shaped such that said rotor body is driven by said first liquid along with said number of further extending vanes.

5. A liquid proportioning apparatus as claimed in claim 1 wherein said plurality of vanes comprises four vanes and wherein is included an arcuately extending relief disposed in said housing for preventing said first liquid from arcuately driving a vane which is adjacent said relief.

6. A liquid proportioning apparatus as claimed in claim 1 wherein said output port is arcuately disposed from said inlet port by an angle of approximately 180°, said plurality of vanes includes four vanes, and said housing includes an arcuately extending relief disposed therein for preventing said first liquid from being arcuately driven by one of said vanes.

7. A liquid proportioning apparatus as claimed in claim 1, wherein said pumping means includes a piston and a cylinder.

8. A liquid proportioning apparatus as claimed in claim 1, wherein said pumping means comprises a diaphragm type pump.

9. A liquid proportioning apparatus as claimed in claim 1, including means to relieve back pressure against said plurality of vanes as they wipe the inner surface of said housing.

10. A liquid proportioning apparatus as claimed in claim 1, wherein said plurality of vanes are substantially comprised of the material polytetrafluoroethylene.

* * * * *